3,281,583
INTEGRATOR USING DIGITAL TECHNIQUES
Maurice I. Zeldman, West Hempstead, Rubin Feinberg, Hicksville, and James J. Walker, New York, N.Y., assignors to Bulova Research and Development Laboratories, Inc., Woodside, Long Island, N.Y., a corporation of New York
Filed May 29, 1962, Ser. No. 198,485
8 Claims. (Cl. 235—183)

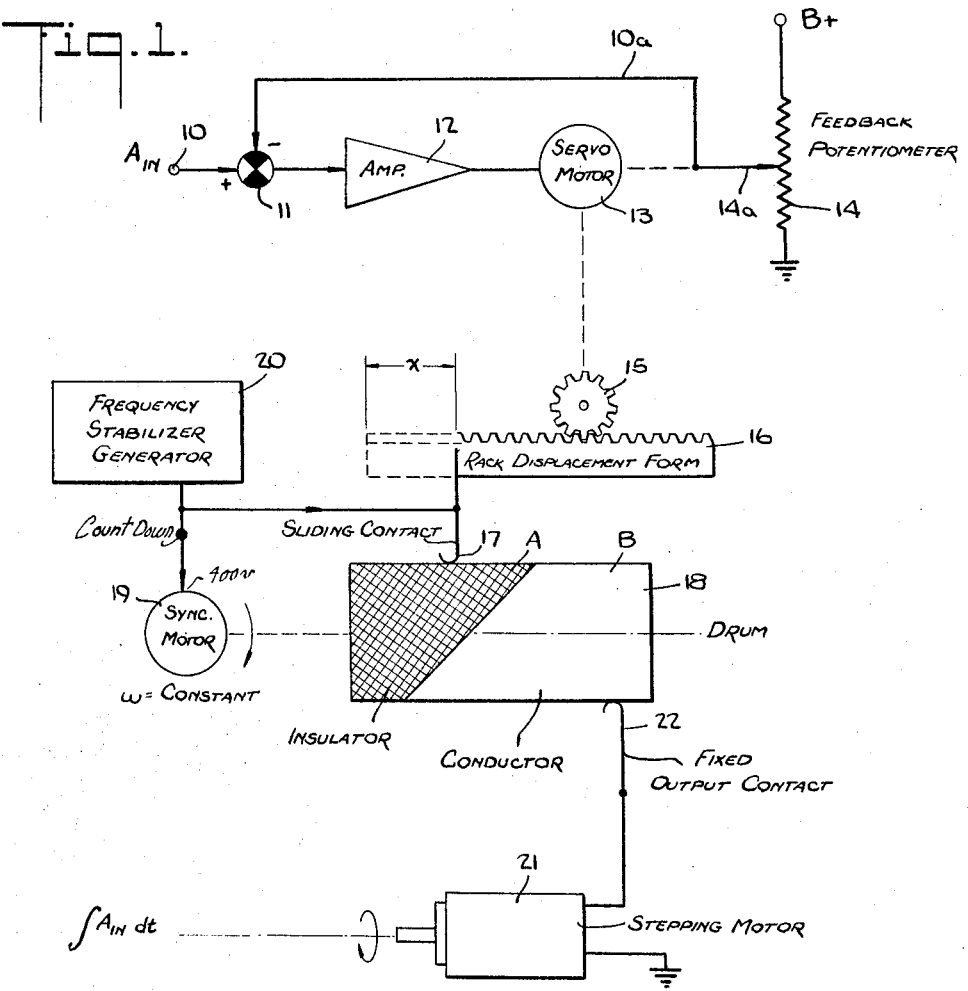
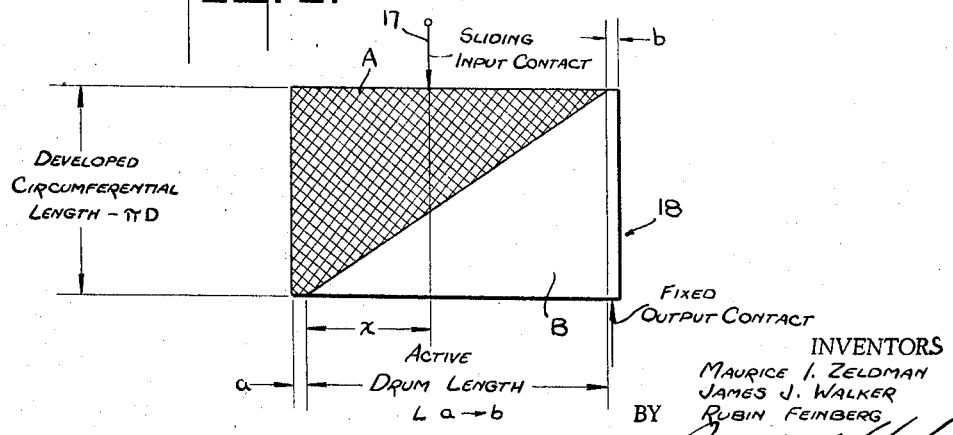

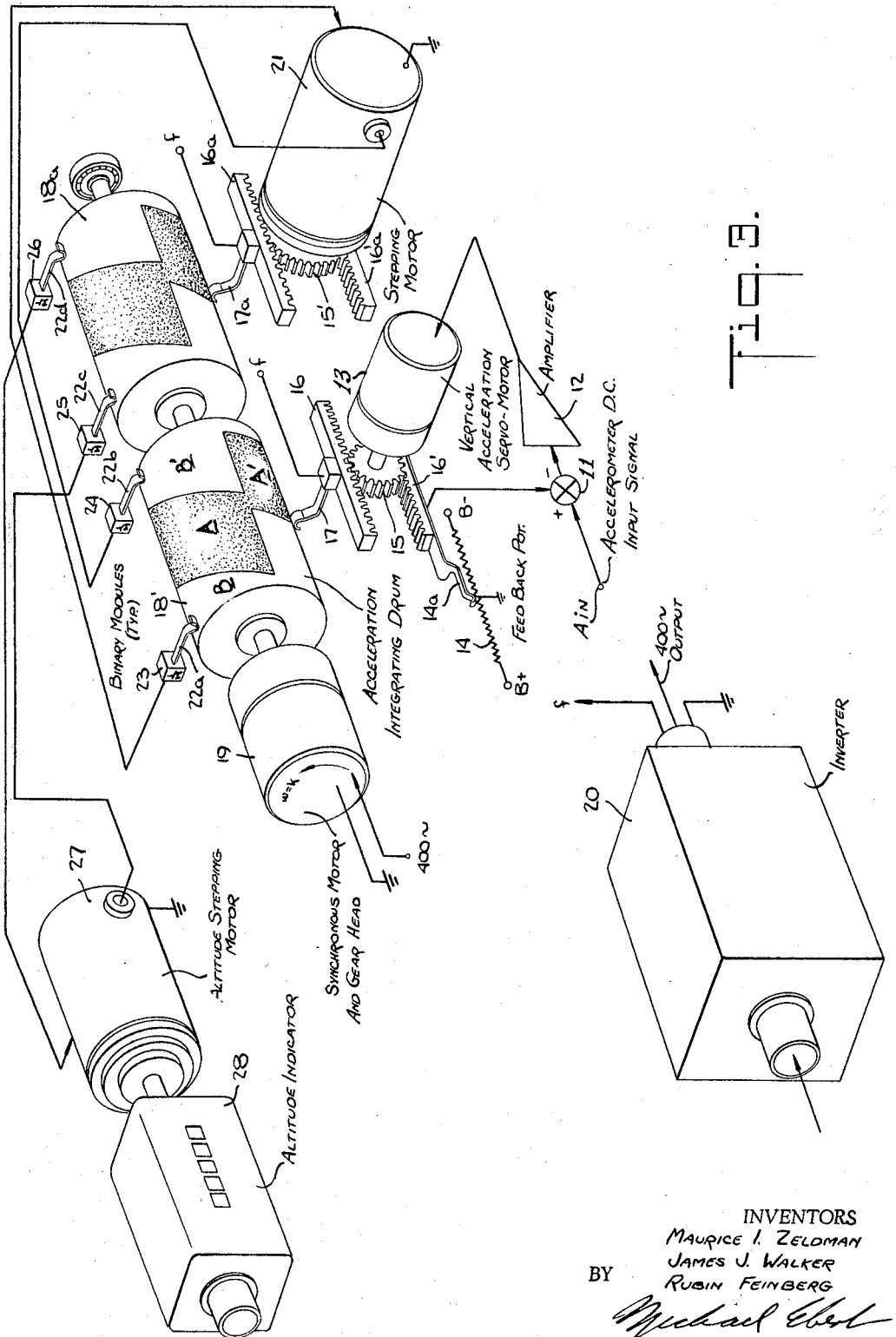

The present invention relates generally to integrators for use in analog computers, inertial navigation systems and any other applications requiring integration, and more particularly to a novel electromechanical integrator of exceptional accuracy employing digital techniques.

Inertial navigation is based on the measurement of acceleration. The navigation problem requires position or velocity data, and the measurement of acceleration is not directly applicable thereto. However, since velocity is the first integral of acceleration and distance is the second integral thereof, by integrating acceleration twice, the value of distance may be obtained with respect to an initial starting velocity or starting point.

Acceleration is sensed inertially by the use of accelerometers, the measurement being made with respect to a stable system of references. While the present invention will be disclosed in connection with the integration of an analog voltage generated by an accelerometer, it is to be understood that the invention is not in any way limited to this specific application and may be used in conjunction with any system requiring integration.

Among the known forms of integrators are the variable speed motor type, the ball and disc mechanical integrator, the thermal integrator, and the electronic R–C or R–L type. Conventional integrators exhibit certain inaccuracies which impair their usefulness. These inaccuracies arise by reason of friction, backlash, limited frequency range, temperature extremes, instability and other shortcomings.

The general class of electromechanical integrators for use in guided missiles features a tachometer-generator of high output-to-null ratio, integrally coupled to a motor, the combination being temperature stabilized. Unfortunately, the requirement for temperature stabilization precludes its use aboard short commit-time missiles.

Accordingly, it is the principal object of this invention to provide an integrator which makes use of inherently accurate digital techniques.

More specifically, it is an object of this invention to provide a self-compensating integrator which lends itself to reliable operation under the difficult conditions encountered in guided missile systems, the integrator being relatively lightweight and compact. A significant feature of the integrator in accordance with the invention is that it does not require warm-up nor does it need adjustment after extended storage periods, thus making possible a short alert-to-launch capability without entailing heaters and obviating the need for trim prior to use.

Also an object of the invention is to provide an integrator adapted to perform an unlimited number of integrations on the same time base.

A further object of the invention is to provide a function generator to produce an output representative of a functional relationship.

Briefly stated, these objects are accomplished in an integrator comprising a servo system responsive to an analog value and acting to shift an input contact to a position along a drum as a function thereof, the drum turning at a constant speed and having a continuous series of tracks formed thereon, each track being constituted by a conductive portion and a non-conductive portiton in a ratio depending on the track position in the series thereof.

Applied to the input contact is a continuous pulse train, and also engaging the drum surface at a fixed position thereon is an output contact which is effectively connected to the input contact only when the latter engages a conductive portion of a track, whereby the fraction of the pulses yielded at the output contact in the course of a drum revolution depends on the particular track selected by the input contact, which choice is a function of the analog voltage. By applying the output pulses to a stepping device which rotates incrementally in accordance with the digital pulses applied thereto, the desired integral of the input analog value may be obtained.

For a better understanding of the invention as well as other objects and further features therein, reference is made to the following detailed description to be read in connection with the accompanying drawing wherein:

FIG. 1 is a schematic drawing of a digital integrator in accordance with the invention.

FIG. 2 is a developed view of the surface of the drum incorporated in the integrator.

FIG. 3 shows, in perspective, another preferrred embodiment of an integrating system which functions to perform a double integration.

Referring now to the drawings and more particularly to FIG. 1, showing an integrator in accordance with the invention, information to be integrated is applied at input terminal 10. By way of illustration, we shall assume that such input information is generated by an accelerometer and is an electrical acceleration analog $A_{in}$. This input voltage is applied to a summing junction which may take the form of a differential amplifier whose output is constituted by the algebraic sum of two input voltages. The summed output is fed through a linear amplifier 12 to a servo motor 13.

The servo motor 13 is operatively coupled to the slider arm 14a of a potentiometer 14 across which a constant direct voltage is applied. The voltage established at the slider arm is fed back to the summing junction 11, through feed-back path 10a, whereby the voltage applied to the input of amplifier 12 is the algebraic sum of the analog input at terminal 10 and the feed-back voltage fed through path 10a.

In operation, the servo motor 13, in response to input voltage $A_{in}$, rotates slider arm 14a until the feed-back voltage, when combined with the input voltage, produces a null which brings the servo motor to a halt. Thus a motor rotation proportional to the input signal is obtained.

Servo motor 13 is coupled to a pinion 15, intermeshing with a rack 16 whereby the rotary motion of the servo is converted into a linear displacement. The total distance that rack 16 is displaced from the zero position is represented by letter X and is a function of the input voltage $A_{in}$. Thus:

$$X = \frac{A_{in}}{K_1} \quad \text{(Equation 1)}$$

where $K_1$ is a servo constant in volts/inch.

It should be noted that the integrator can be supplied with an input X directly, thereby eliminating the position servo for certain applications.

Linked to rack 16 is an electrical contact 17 which is slidable longitudinally across the surface of a drum 18. This drum is composed of a conductive area B (shown in white) and a non-conductive area A (shown cross-hatched). Drum 18 is driven by a synchronous motor 19 energized by a frequency-stabilized generator 20, whose carrier frequency is represented by symbol $f$. In practice the carrier frequency $f$ will be set sufficiently high to insure a specified accuracy. This frequency will be "counted down" to a standard servo frequency, say 400 cycles which is used to drive the synchronous motor. Then the carrier frequency $f$ will be applied to contact 17 and effectively constitutes a pulsatory source having the same repetition rate as $f$.

FIG. 2 is a planar development of a cylindrical surface of the drum. It will be seen that the surface is divided into two identical triangular areas A and B, the area A on the drum terminating in a circumferential track $a$ which is entirely non-conductive. The area B on the other hand terminates in a circumferential track $b$ on the opposing end of the drum, which is entirely conductive. The surface of the drum may be considered to consist of a continuous series of tracks extending from track $a$ to track $b$, successive tracks having progressively different ratios of non-conductive to conductive portions.

Thus, when the rack positioned contact 17 engages track $b$ and a voltage having a frequency $f$ is fed thereto, with the drum 18 rotating at a constant speed, R revolutions per second, the total number of the frequency cycles N transmitted through the contact for one revolution of the drum is:

$$N = \frac{f}{R} \text{ cycles/rev.} \quad \text{(Equation 2)}$$

An output contact 22 is maintained at a fixed position in engagement with the last track in the series, conductive track $b$. Hence when the sliding input contact 17 engages non-conductive track $a$, no connection is ever completed between the input and output contacts in the course of a drum revolution. However, when the input contact 17 occupies other track positions along the drum, during each rotation thereof there will be a period when the input contact engages a non-conductive area so that no connection will be made between contacts, and a period when the input contact engages the conductive area to complete the connection between contacts, depending on the ratio of the selected track.

Thus, in the track position X shown in FIG. 2, the drum will present a relatively long portion of non-conductive surface followed by a short portion of conductive surface. As the input contact is shifted in the direction of end track $b$, the ratio of conductive to non-conductive portions increases, while when the contact is shifted in the opposing direction of end track $a$, this ratio decreases.

Fixed output contact 22 is connected to a stepping motor 21 having an output shaft which rotates a fixed angular increment for each pulse of the voltage applied thereto. If, for example, it is assumed that the frequency $f$ is 400 cycles, then when the moving rack contact 17 is at track position $b$, the connection between contacts will be uninterrupted, and assuming that the drum made one revolution per second, N will then be equal to 400 and the stepping motor will go through 400 increments in that one second.

At other track positions of the rack contact 17, in which the track has different ratios of non-conductive and conductive portions, the number of pulses applied to the stepping motor per second will necessarily be some fraction of N, this fraction being dependent on the position X of the contact: Thus, $$P_x = N \frac{X}{L_{a \to b}} \quad \text{(Equation 3)}$$

where $a$ and $b$ are circumferential tracks on the drum, the area A thereon, as shown in FIG. 2, terminating in the circumferential track $a$, which is entirely non-conductive, and the area B terminating in circumferential track $b$, which is entirely conductive, $L_{a \to b}$ being the distance between these tracks; and where $P_x$ is that fraction of N that is transmitted to the stepping motor per revoluion of the contact drum when the sliding contact is at position X.

Inasmuch as N and $L_{a-b}$ are constant for a given system, then $$P_x = K_2 X \quad \text{(Equation 4)}$$

Substituting Eq. 1 into Eq. 4.

$$P_x = \frac{K_2 A_{in}}{K_1}$$

$$A_{in} = K_3 P_x \quad \text{(Equation 5)}$$

where $K_3$ is a constant which is equal to $K_1$, the servo constant, over $K_2$, the maximum number of pulses supplied during one drum revolution.

The integral of $A_{in}$ over a period of time is then:

$$\int A_{in} dt = \sum_{x=1}^{n} P_x = P_{x_1} + P_{x_2} + \ldots P_{x_n} = \text{Velocity} \quad \text{(Equation 6)}$$

where $n$ is the number of time periods during which the summation occurs.

But, since the stepping motor output shaft rotates a fixed angular increment per frequency cycle or pulse, the output shaft rotation of the stepping motor is proportional to the integral of $A_{in}$ or velocity. This velocity output can then be fed to a second similar drum where another integration is performed. The output from the second drum is proportional to the displacement. It is again noted that integration in the example given is with respect to the input supplied by an accelerometer and hence the first and second integrals are velocity and displacement, respectively.

It will be evident from the foregoing that the servo system, responsive to the input analog value, shifts the rack contact linearly to a position which is a function of this value, and thereby selects a track in the series thereof on the drum which effectively switches to the output contact in the course of each drum revolution a group of digital pulses having a count which is a function of the input analog, the group of digital pulses bringing about an angular displacement constituting the desired integral. While the drum in FIG. 2 is shown as having conductive and non-conductive areas of triangular configuration, it is also possible to shape these areas to have contours expressive of functional curves and thereby provide a function generator.

We shall consider the structure of a practical integrator based on the principles disclosed in connection with FIGS. 1 and 2 and adapted to doubly integrate the output of an accelerometer whose sensitive axis is aligned vertically, whereby the analog value $A_{in}$ is an analog of the vertical acceleration. The system disclosed in connection with FIG. 3 performs a double integration on this input, keeping track of sign (descent or ascent) to afford a continuous indication of altitude. This altitude may be read directly by a counter or can be used to close switches at predetermined altitude points in a missile trajectory to carry out altitude-related functions.

In actual practice, the system would also have to take into account gravitational acceleration, and a $g$ bias for this purpose would be applied to the summing junction. But this factor, which is not relevant to the operating principles of the integrator, will be disregarded in the description to follow.

The input signal $A_{in}$ is applied to the summing junction 11, where it is combined with the feedback voltage from the slider arm 14a of the potentiometer 14, the resultant voltage being fed through amplifier 12 to servo motor 13 which operates pinion 15. The rack is of balanced configuration and consists of a first rack 16 to which the input contact 17 is attached, and a second rack 16' to which the slider arm 14a is attached. In this way the rack displacement of the drum contact is balanced with the rack displacement of the potentiometer slider so that in a missile installation linear shock, vibration and acceleration do not disturb the null position of the servo. In other applications, in which the integrator is not subjected to mechanical forces, a single rack may be used, as shown in FIG. 1.

The pulsatory voltage for the integrator and the energizing voltage for the synchronous motor 19, driving drum 18', are preferably derived from an inverter 20 which is battery operated to produce a servo frequency alternating voltage, 400 cycles, and is frequency stabilized at frequency $f$ (prior to count down) by crystal control. The synchronous motor drives drum 18' at a constant speed.

Drum 18' is similar to drum 18 in FIG. 1, save that it has non-conductive surfaces A and A' as well as two separated conductive surfaces B and B', so that it is adapted to integrate bi-directional inputs.

Operating in conjunction with the drum surface is the sliding rack contact 17, which shifts in either direction therealong. Also provided are two fixed contacts 22a and 22b which engage the fully conductive tracks at opposite ends of the drum 18' to provide $x$ and $y$ outputs, respectively, through binary modules 23 and 24. These modules serve to count down the frequency to a pulse rate at which the stepping motor can operate reliably. In FIG. 1 these modules were omitted, for reasons of simplicity.

Thus a positive net acceleration causes the rack contact 17 to shift to the left and thereby provide a signal on the $x$ line, to drive the velocity stepping motor 21 counterclockwise to an extent depending on the number of pulses applied thereto, as divided down by the binary module 23. A negative net acceleration will position the rack contact 17 to the right, producing a signal on line $y$ and driving the velocity stepping motor clockwise through binary module 24. The stepping motor 21 therefore produces the first integral (velocity) of the input acceleration analog $A_{in}$.

To derive the second integral, the velocity stepping motor 21 operates a dual rack 16a and 16a' through the pinion 15', the rack being operatively coupled to a sliding contact 17a which engages the surface of a drum 18a, identical in all respects to drum 18'.

Fixed drum output contacts 22c and 22d engage the end tracks therein to provide outputs $u$ and $v$ through count down binary modules 25 and 26. Outputs $u$ and $v$ are applied to a stepping motor 27, responsive to the sense and count number, to produce a proportional angular shaft displacement which is a function of altitude (vertical distance), i.e., the second integral of vertical acceleration. This value may be read by a counter 28 calibrated in terms of feet.

It is to be noted that the velocity integrating drum 18a and the acceleration integrating drum 18' are driven by the same synchronous motor 19, and that the high frequency signals $f$, used for the first and second integrations, are identical. The altitude stepping motor operates in the clockwise direction in response to a $u$ signal and the counterclockwise direction for a $v$ signal to drive the counter 28 accordingly and thereby indicate ascent or descent, as the case may be.

Since the same frequency source 20 produces the synchronous motor or timing frequency by counting down the pulse carrier frequency, the unit is self compensating for frequency. It is also to be noted that the integration process is not performed by a friction drive, as is the case with ball and disc type integrators and the outputs are therefore capable of yielding useful work without sacrificing accuracy.

The nature of the device is such that an unlimited number of integrations may be performed on the same time base, and the binary storage technique permits the use of standard stepping motors without a loss of integration accuracy. Since the device discriminates between up and down motions, it permits differentation between altitude functions during descent and ascent in flight. Thus, instead of feeding in pulses to the drum, the conductive drum areas may be constituted by conductive striations to produce pulses at the output contact, with D.-C. being applied at the input contact.

While there has been shown what is considered to be preferred embodiment of the invention, it is to be understood that many changes and modifications may be made therein without departing from the essential spirit of the invention as defined in the appended claims.

What we claim is:

1. A digital integrator to effect double integration comprising a servo system responsive to an analog value to produce a linear displacement proportional thereto, a generator continuously producing pulses at a predetermined repetition rate, switching means coupled to said generator and responsive to said linear displacement periodically to extract from said continuous pulses a train thereof having a count in accordance with said displacement, and means responsive to said train of pulses to produce an angular displacement constituting the integral of said analog value, a second switching means coupled to said generator and responsive to said angular displacement periodically to extract from said continuous pulses a second train thereof having a count in accordance with said angular displacement, and means responsive to said second train to produce the double integral.

2. A digital integrator comprising a servo system responsive to an analog value to produce a linear displacement in accordance therewith, a rotary drum revolving at a constant rate, said drum having a series of circumferential tracks thereon formed of conductive and non-conductive portions, the first of which is entirely non-conductive and the last of which is entirely conductive, the intermediate tracks having progressively different ratios of conductive and non-conductive portions, an input contact slidable along said drum and operatively coupled to said servo system to engage a selected track depending on said linear displacement, a fixed output contact engaging said last track, a source of continuous pulses having a predetermined repetition rate, and a stepping motor actuated by said source through said input and output contacts when said input contact engages a conductive portion whereby the count of pulses fed thereto in the course of each drum revolution depends on the selected track, said motor being rotated one angular increment per pulse applied thereto to produce the integral of said analog value.

3. An integrator, as set forth in claim 2, further including a binary device interposed between said motor and said fixed contact to count down the applied pulse.

4. An integrator, as set forth in claim 2, wherein said drum is divided into two series of tracks and is provided with an output contact for each series to effect bi-directional operation.

5. A digital integrator comprising a servo system responsive to an analog value to produce a linear displacement of a rack in accordance therewith, a rotary drum, a synchronous motor revolving said drum at a constant rate, said drum having a series of circumferential tracks thereon formed of conductive and non-conductive portions, the first of which is entirely non-conductive and the last of which is entirely conductive, the intermediate tracks having progressively different ratios of conductive and non-conductive portions, an input contact slidable along said drum and operatively coupled to said rack to engage a selected track depending on the extent of said linear displacement, a fixed output contact engaging said last track, an alternating-current source of continuous pulses having a predetermined repetition rate, a stepping motor actuated from said source through said input and output contacts whereby the count of pulses fed thereto in the course of each drum revolution depends on the selected track, said stepping motor being rotated one angular increment per pulse to produce the integral of said analog value, and a counter coupled to said stepping motor to provide an integral value.

6. An integrator, as set forth in claim 5, wherein said synchronous motor is driven from said alternating-current source to compensate for variations in pulse frequency.

7. A digital double integrator comprising a servo system responsive to an analog value to produce a linear displacement in accordance therewith, a rotary drum turning at a constant rate, said drum having a series of tracks thereon formed of conductive and non-conductive portions, the first of which is entirely non-conductive and the last of which is entirely conductive, the intermediate tracks having progressively different ratios of conductive and non-conductive portions, an input contact slidable along said drum and operatively coupled to said servo system to engage a selected track depending on said linear displacement, a fixed output contact engaging said last track, a source of continuous pulses having a predetermined repetition rate, a stepping motor actuated from said source through said input and output contacts whereby the count of pulses fed thereto in the course of each drum revolution depends on the selected track, said motor being rotated one angular increment per pulse to produce the integral of said analog value, a second and identical drum, a second input contact slidable on said second drum and coupled to said motor to select a track thereon, a second stepping motor, and a second fixed contact engaging the last track on said second drum to couple said source thereto to produce a double integral.

8. An integrator, as set forth in claim 2, wherein said source of pulse is constituted by striations in the conductive portions of said drum, and by a direct-voltage supply connected to said input contact, whereby pulses are produced at said output contact as said drum rotates.

References Cited by the Examiner

UNITED STATES PATENTS

| | | | |
|---|---|---|---|
| 2,137,133 | 11/1938 | Dallmann | 235—183 |
| 2,398,238 | 4/1946 | McNatt | 235—183 |
| 2,717,310 | 9/1955 | Woodruff. | |

FOREIGN PATENTS

| | | |
|---|---|---|
| 1,169,431 | 9/1958 | France. |
| 1,172,585 | 10/1958 | France. |

MALCOLM A. MORRISON, *Primary Examiner.*

I. KESCHNER, K. DOBYNS, *Assistant Examiners.*